May 9, 1944.   H. A. DROITCOUR ET AL   2,348,530
GAUGE
Filed Feb. 2, 1942   2 Sheets-Sheet 1
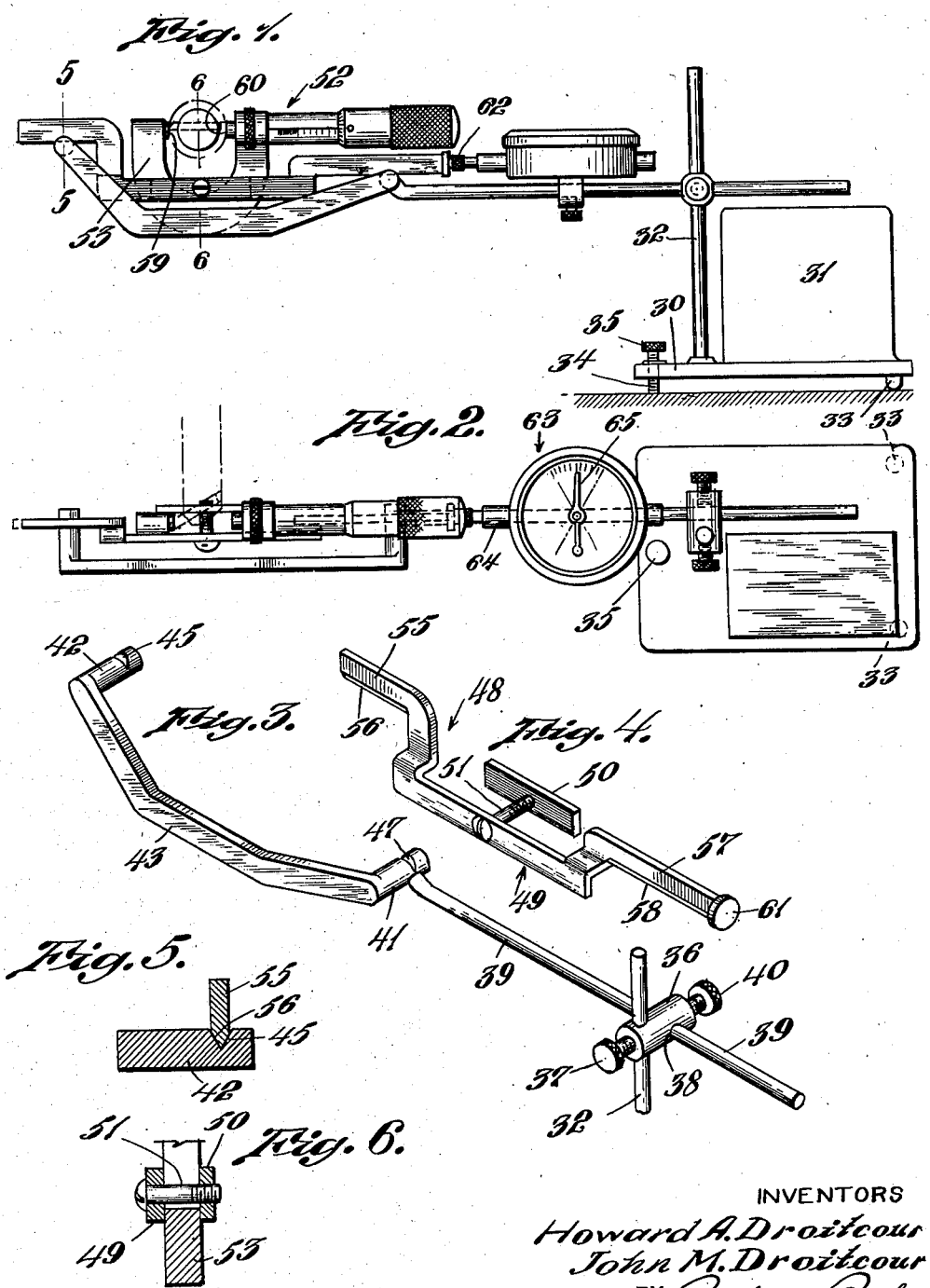
INVENTORS
Howard A. Droitcour
John M. Droitcour
BY Barlow & Barlow
ATTORNEYS May 9, 1944. H. A. DROITCOUR ET AL 2,348,530
GAUGE
Filed Feb. 2, 1942  2 Sheets-Sheet 2
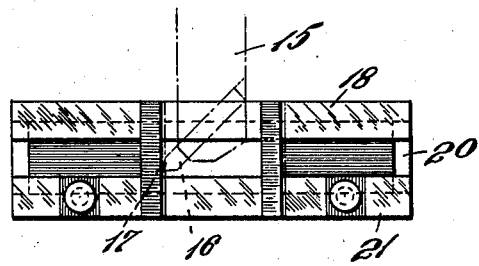
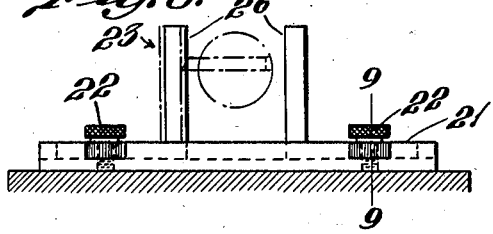
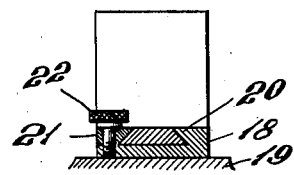
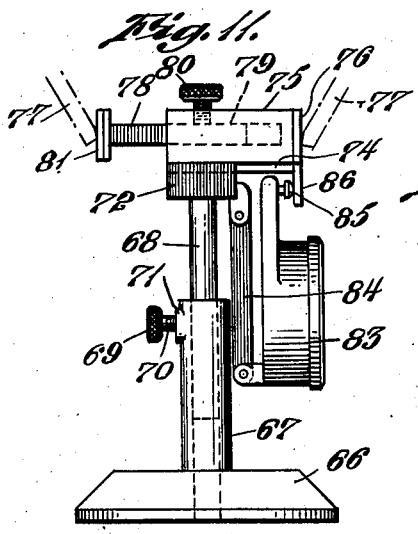
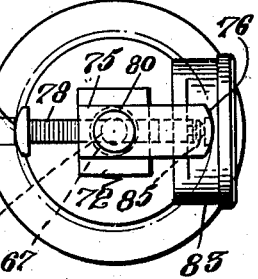
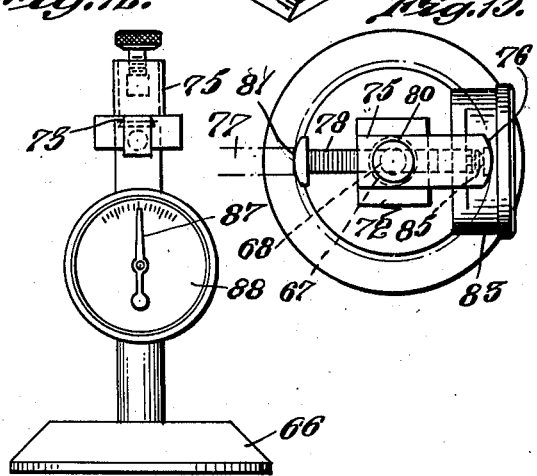
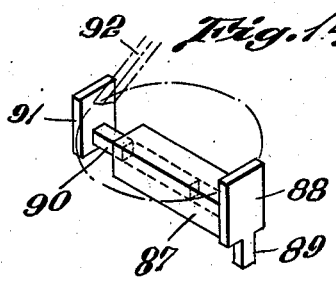
INVENTORS
Howard A. Droitcour
John M. Droitcour
BY Barlow & Barlow
ATTORNEYS Patented May 9, 1944

2,348,530

UNITED STATES PATENT OFFICE 2,348,530

GAUGE

Howard A. Droitcour, Cranston, and John M. Droitcour, Warwick, R. I.

Application February 2, 1942, Serial No. 429,209

6 Claims. (Cl. 33—185)

This invention relates to a gauge for the purpose of determining the diameter of a circle described by an innermost or outermost point of a revolving tool.

In the use of a revolving tool having a single cutting point, rough measurements due to markings on the cutting tool with reference to a datum line on another part of the rotating instrument are not sufficiently accurate. Where accuracy of the diameter of the circle described is of importance it is usual to cause this revolving cutting point to describe a circle upon some waste stock and then to measure on such stock the circle described. If the circle described is not exact as to size then adjustment of the single cutting point must be had with relation to the axis of rotation of the rotary tool and this performance is again had until the circle described by the cutting point is that which is required. Thus the gauging of a circle described by the relative rotation of the work and the cutting tool where a single cutting point is used, is difficult of determination.

One of the objects of this invention is to provide a gauge by which the exact measurement described by the cutting point of a revolving tool may be predetermined without the necessity of describing a trial circle in waste material before measurement may be obtained.

Another object of this invention is to provide a method of predetermination of the diameter of a circle described by a single cutting point of a revolving tool which may be utilized either for inside or outside gauging measurement.

Another object of this invention is to provide a device which will utilize a measuring instrument such as a micrometer for a rough setting of an approximate size and then by use of a dial gauge and such micrometer determine exactly the diameter described by the cutting point of the revolving tool.

With these and other objects in view, the invention consists of certain novel features of construction, as will be more fully described and particularly pointed out in the appended claims.

In the accompanying drawings:

Fig. 1 is an elevation illustrating our apparatus equipped with a micrometer and showing a boring bar and single cutting tool extending therefrom.

Fig. 2 is a top plan view of the structure shown in Fig. 1.

Fig. 3 is a perspective view of the support for the movable carriage.

Fig. 4 is a perspective view of the carriage which is associated with the support shown in Fig. 3.

Fig. 5 is a sectional view on substantially line 5—5 of Fig. 1.

Fig. 6 is a sectional view on substantially line 6—6 of Fig. 1.

Fig. 7 is a top plan view of a simplified form of the invention illustrating, largely diagrammatically, the method provided in our invention for arriving at the results desired.

Fig. 8 is a side elevation of the arrangement in Fig. 7 mounted upon a support which is shown in section.

Fig. 9 is a sectional view on substantially line 9—9 of Fig. 8.

Fig. 10 is a perspective view of one of the relatively movable members shown in Figs. 7, 8 and 9.

Fig. 11 illustrates a modified form of the invention shown in elevation.

Fig. 12 is an end view of the structure shown in Fig. 11.

Fig. 13 is a top plan view thereof.

Fig. 14 is a modified form of the invention which may be substituted for a part of the structure shown in Figs. 11 and 12.

Gauge apparatus, which is the subject of this invention, may be used for the determination of either inside circles made by the use of a boring tool, or of the determination of outside circles made by a revolving tool or revolving the work with reference to a single lipped cutter. In Fig. 7 we have illustrated in dash-dot lines at 15 a boring bar type of rotary tool which will have a tool 16 adjustably held in the bar and which, by reason of rotation of the bar, will cause the outermost cutting point 17 to describe a circle. Fig. 7 illustrates a very simple form of carrying out the method embodied in this invention wherein we have provided a base 18 mounted upon some suitable support 19 and provided with a dove-tail slot 20 extending longitudinally of the base. The rail 21 which forms a part of this base and one of the surfaces of the dove-tail slot, is adjustably secured to the base by means of the thumb screws 22. A pair of members 23 having upright abutment portions 24 and dove-tail slides 25 are movable in the dove-tail slots 20 and may be clamped in adjusted position in these slots by reason of the thumb screws 22. The inside surfaces 26 of these members 23 are parallel and will be positioned so that they will be parallel to the axis of rotation of the boring bar 15.

In use, the device such as shown in Figs. 7 and 8 will be positioned so that the surfaces 26 are parallel to the axis of rotation of the bar 15 and these surfaces will be set just a little closer together than the approximate distance of the diameter which will be swung by the cutting point 17. The members 23 will be free to slide in their dove-tail slots. As the tool 15 is rotated the cutting point 17 will press against first one member 23 to push it slightly along the slot 20 and then as the tool is rotated 180 degrees it will press against the bearing surface 26 of the other member 23 and move this member along the slot 20. Thus there will be provided between the surfaces 26 the exact diameter which will be cut by the cutting point 17. These surfaces may then be clamped in position by the thumb nuts 22 and some gauging means utilized for determination of the distance between the parallel surfaces 26.

This underlying method above described has been carried forward into an apparatus whereby the actual determination of the circle described may be at once indicated without the necessity of using a separate instrument for the measurement of the distance between the surfaces engaged by the cutting point, and in Figs. 1 to 6 we have illustrated this apparatus in a form in which the usual micrometer may be utilized as a part thereof.

In Fig. 1 a base 30 is weighted as at 31 and provided with a supporting standard 32. Fixed feet 33 are formed at two corners of the base while an adjustable foot 34 is provided at substantially the apex of an isosceles triangle having as its base a line between the feet 33. This foot 34 is adjusted by the thumb screw 35. The standard 32 (see Fig. 3) has a bracket 36 adjustably held thereon by means of the set screw 37 and receives in a bore 38 extending at right angles to the standard 32 a supporting rod 39 which is adjustably held in this bore by means of a thumb screw 40.

This rod 39 supports a laterally extending arm 41 and a second laterally extending arm 42 which are suitably secured together by a tie member 43 shaped to suitably support a carriage which is movably related with reference thereto. In the showing which we have here made, this tie member 43 extends downwardly from one arm, then parallel to the supporting rod 39, and then upwardly so as to position the arm 42 at a horizontal position above the arm 41, but this arrangement is merely for cooperation with the suitable shape of carriage which is to be supported. The arms 41 and 42 have V-shaped notches 47 and 45 therein which serve to guide the carriage in its motion relative to this support.

The carriage shown in Fig. 4 is designated generally 48 and consists of a body portion 49 having a clamping jaw 50 and a set screw 51 for moving the clamping jaw 50, whereby a micrometer, designated generally 52 and having a U-shaped frame 53 may be clamped between the jaw 50 and the body 49 to fixedly relate it with reference to the carriage 48. A guide rail 55 extends longitudinally from one end of the carriage and is V-shaped as at 56 to fit in the groove 45 while a guide rail 57 extends longitudinally from the other side of the carriage with a V-shaped edge 58 to fit in the groove 47. The grooves and guides are in alignment and at right angles to the abutment surfaces 59 and 60 of the micrometer 52 so as to move in a line at right angles thereto.

An abutment contact surface 61 is provided on the end of the guide rail 57 to engage the feeler 62 of the dial gauge designated generally 63. This feeler 62 may slide into or out of the stem 64 of this dial gauge to cause a relative movement of the hand 65 of the dial gauge to indicate the amount of movement of the feeler 62. It is usual that there be a spring within the dial gauge tending to move the feeler 62 outwardly to a limited extent at which point the dial gauge will indicate zero. This pointer 65 may be arranged for movement for either plus or minus by reason of there being some compression of the spring and the feeler held under such compression, whereby movement of the carriage in both directions may be indicated.

In use the micrometer will be set just a little less than the approximate size which it is believed the cutting point will describe when the boring bar is rotated. The boring bar will then be rotated to touch first one surface 59 and then another surface 60 and as these surfaces are touched they will be moved slightly by the boring bar point pressing against these surfaces, to move the micrometer and the carriage upon which it is mounted. The amount of movement will be indicated on the dial indicator and by adding this movement to the setting of the micrometer, the accurate diameter of the circle which is described by the point will be obtained.

The same principle as set forth in connection with the method used in the description of Figs. 7, 8 and 9 may be employed for the determination of the diameter of a circle described by a cutting point of a revolving tool for cutting an outside diameter, and in Figs. 11 and 12 we have illustrated a base 66 having a standard 67 with a telescoping rod 68 therein. The thumb screw 69 is threaded as at 70 in the boss 71 to press against the rod 68 and hold it in adjusted position as to height. At the upper end of the rod 68 a support 72 is provided having a groove 73 therein for receiving the dove-tail guide 74 of a carriage 75 which may slide back and forth in this dove-tail groove. The axis of the rod 68 is in the center line of this groove. One end of this carriage 76 serves as an abutment surface against which the rotating cutting tool shown in dotted lines at 77 may engage. A rectangular bar 78 is slideably guided in a correspondingly shaped bore 79 in the carriage 75 and may be clamped in adjusted position by the thumb screw 80 bearing against this bar 78. An enlarged abutment surface 81 is provided at the end of bar 78. The surface 76 is shaped so that its intersection with any plane including the axis of rotation is substantially a straight line parallel to the axis. The surfaces are arranged so that the largest distance perpendicular to the axis of rod 68 between the surfaces 76 and 81 is in a plane that includes the axis of rod 68. Such a shape could be a portion of the surface of a cylinder whose diameter is slightly less than the smallest diameter intended to be measured. Surfaces 76 and 81 are alike. Surface 76 is also for engagement by the cutting point 77.

The support 72 has a dial gauge 83 secured thereto by bracket 84 and its feeler 85 engages the downwardly extending arm 86 of the carriage 75 so that movement of the carriage will force this feeler 85 inwardly, or the same may be pushed outwardly by the spring of the dial gauge so as to follow the arm 86 and indicate the amount of movement of the carriage by reason of the pointer 87 on the dial 88.

The instrument shown in Figs. 11 and 12 when in use will be positioned so that the axis of rod 68 is substantially coincident with the axis of rotation of the cutting point 77. The tool will then be rotated after the curved surfaces 76 and 81 as shown in Fig. 13 are set to a known size which is a little larger than the diameter which will be described by the tool, so that the tool will first contact one surface and slide the carriage 75 in one direction and then will contact the other surface and slide the carriage in the opposite direction, the amount of movement being determined by the dial 88 and pointer 87.

The diameter of the described circle is then determined by subtracting the amount of movement indicated by the dial indicator from the known distance between surfaces 76 and 81. To take a measurement without the use of the dial indicator, the thumb screw 80 is released. The tool 77 may first engage the surface 76 to move it in its slideway to position and then engage the surface 81 to move the rod 78 inwardly to its position, there being more freedom of movement between the rod 78 and the bore 79 than between the carriage 75 and its slideway 73, so that after the setting of the carriage 75 has occurred it will not be disturbed by the setting of the rod 78 due to pressure of the tool on the surface 81. The largest distance perpendicular to the axis of rod 68 between the faces 76 and 81 is then measured with a micrometer or other gauging means.

In Fig. 14 we have illustrated an alternative arrangement of carriage to be positioned on the support 72, which arrangement may be used for the determination of inside diameters. In this modification the carriage is designated 87, having an abutment surface 88 and an arm 89 for engagement with the feeler member 85, while there is a rod 90 having an abutment surface 91 so that as rotation of the tool, now designated 92, occurs, it will engage the inside abutment surface of 91 and the inside abutment surface of the member 88 for moving these apart to a diameter which may be later gauged, or these may be fixed together and moved to indicate on the dial gauge in the same manner as here explained.

It will be apparent that this invention may be applied to devices for predetermining either the outermost or innermost point of a rotating tool and we have referred to this innermost or outermost point as the sizing point of the tool as this governs the size of the circle to be produced.

We claim:

1. In a gauge, a carriage a standard calibrated micrometer, means for separably holding said micrometer in fixed relation to said carriage, a support for the carriage, along which the same may be moved and means fixed with relation to said support and responsive to the movement of the carriage to show the amount of movement of the carriage.

2. In a gauge, a carriage a standard calibrated micrometer, means for separably holding said micrometer in fixed relation to said carriage, a support for the carriage along which the same may be moved, and a dial indicator fixed with relation to said support and having a feeler engaging said carriage to show the amount of movement of the carriage relative to said support.

3. In a gauge, a carriage a standard calibrated micrometer, means for separably holding said micrometer in fixed relation to said carriage and provided with longitudinal guides, a support for the carriage having grooves to receive said guides and along which the same may be moved, and means fixed with relation to said support and responsive to the movement of the carriage to show the amount of movement of the carriage.

4. In a gauge, a carriage provided with clamping jaws carried thereby for releasably securing a standard calibrated micrometer in fixed relation thereto, a support for the carriage along which the same may be moved and means fixed with relation to said support and responsive to the movement of the carriage to show the amount of movement of the carriage.

5. In a gauge, a carriage having longitudinal guides and provided with clamping jaws for releasably securing a standard calibrated micrometer in fixed relation thereto, a support for the carriage having grooves to receive said guides and along which the same may be moved and a dial indicator fixed with relation to said support and responsive to the movement of the carriage to show the amount of movement of the carriage.

6. In a gauge, a carriage provided with means carried thereby for releasably securing a standard calibrated micrometer in fixed relation thereto, a support for the carriage along which the same may be moved and means fixed with relation to said support and responsive to the movement of the carriage to show the amount of movement of the carriage.

HOWARD A. DROITCOUR.
JOHN M. DROITCOUR.